Figure 1:
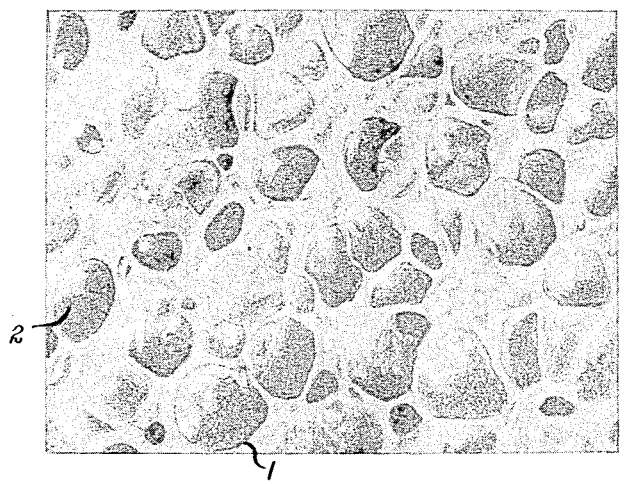

Inventors:
Herbert Lindemann,
Ernst Stirnemann
by: Michael S. Striker
  agt.

United States Patent Office 2,746,088
Patented May 22, 1956

2,746,088

CELLULAR THERMOPLASTIC BODIES

Herbert Lindemann, Sins, Aargau, and Ernst Stirnemann, Basel, Switzerland

Application November 4, 1952, Serial No. 318,576

Claims priority, application Switzerland November 10, 1951

12 Claims. (Cl. 18—48)

The present invention relates to cellular thermoplastic bodies, and more particularly to closed-cell cellular thermoplastic resin bodies having wrinkled cell walls and having a high resistance to breaking upon bending.

It is an object of the present invention to provide a process of producing closed-cell cellular thermoplastic resin bodies wherein the cell walls thereof are wrinkled or have folds therein.

It is a further object of the present invention to provide a process of producing closed-cell cellular thermoplastic resin bodies having wrinkled cell walls and being highly resistant to breaking upon bending.

It is still a further object of the present invention to provide a process of forming new cellular thermoplastic resin bodies wherein the cell walls thereof are wrinkled thereby giving a high extensibility to said bodies.

It is another object of the present invention to provide, as a new article of manufacture, closed-cell, cellular thermoplastic resin articles wherein the cell walls of the same are wrinkled.

With the above objects in view, the present invention mainly comprises the steps of forming a gas-expanded, cellular thermoplastic resin body having closed cells containing gas at a pressure at least equal to atmospheric pressure, and causing the gas pressure in the closed cells of the cellular thermoplastic resin body to be reduced to below atmospheric pressure so that upon exposure to the atmosphere the closed cells are partially collapsed causing the cell walls to become wrinkled.

The preferred methods of reducing the gas pressure in the closed cells of the cellular thermoplastic resin bodies will be more specifically described.

Closed-cell, gas-expanded cellular thermoplastic resin bodies when formed in the customary manner, have spherical or polyhedric-shaped cells. Such cellular bodies are treated according to the present invention to cause the gas pressure therein to be reduced to below atmospheric pressure which thereby causes the cell walls to become wrinkled upon exposure of the body to the atmosphere due to the pressure of the atmosphere on the cell walls. The extent to which the cell walls are wrinkled depends, of course, upon the extent to which the pressure in the cells is reduced.

The gas-expanded thermoplastic resin bodies having closed cells containing gas at at least atmospheric pressure may be formed in any customary manner. Generally, gas is forced into a thermoplastic mass under pressure and the thermoplastic mass containing the gas is heated causing the same to expand and form the cellular body. Such cellular bodies will always have the gas in the cells at at least atmospheric pressure and the cells will always be either spherical or polyhedric in shape. The cellular bodies of the present invention having wrinkled cell walls are irregular in shape and have been found to have extremely good bendability, the same being highly resistant to breaking upon bending.

The cell walls of the cellular bodies produced according to the present invention are herein described by the term "wrinkled." It is to be understood, of course, that these cell walls may also be described as having creases or folds.

These cellular bodies have been found to have greatly improved properties making these bodies suitable for a number of purposes. These bodies have a much higher extensibility and bendability than the ordinary cellular bodies made of the same raw material. In fact, it has been found that these cellular bodies are 10 to 20 times more resistant to breaking upon bending than cellular bodies of the same raw materials formed according to the usual processes which do not produce wrinkled cell walls. These cellular bodies have a higher resistance to breaking upon bending at a bending angle of 90° than do rubber sheets of the same thickness.

The cellular bodies produced according to the process of the present invention are particularly suitable for the manufacture of shoe soles due to the properties of extensibility and resistance to breaking upon bending. By the choice of the type and amount of plasticizer and/or the resin, it is possible to obtain the properties of good viscosity and resistance to abrasion as well as the other properties mentioned. The material obtained which can be used for shoe soles has a lower specific gravity (about 0.1 to 0.8) than the sole material of equivalent properties made of any other type of material. Shoe soles made of this material have a very poor cold and heat conductivity and are therefore highly insulating. Soles made of these materials are particularly good in cold weather and are also impermeable to water and do not slip on slippery surfaces. Slipping is permanently prevented by the use of these materials as shoe soles because the wearing out of the outer layer of cells causes new irregular cells to appear on the outer layer, these cells acting like small suction cups to prevent slipping.

A preferred method of reducing the gas pressure in the closed cells of the ordinary cellular thermoplastic bodies having spherical- or polyhedrical-shaped cells comprises, causing at least a portion of the gas contained in the cells to escape therefrom, so that i. e. applying vacuum the gas pressure in the cells becomes less than atmospheric pressure and upon exposure to the atmosphere thereby causes the cellular body to shrink, the cells to partially collapse, and the cell walls to form wrinkles or folds therein. Of course, this also results in an increase in the specific gravity of the body.

The removal of the gas contained in the closed cells while maintaining the closed-cell cellular structure causes the gas to diffuse through the cell walls. Another method of lowering the gas pressure in the cells is to at least partially fill the gas-containing cells with a vapor which condenses at room temperature and therefore upon exposure at room temperature the condensation of the vapor causes a reduction in the gas pressure in the cells, the atmospheric pressure causing the cells to collapse.

The process of causing the gas contained in the cells to diffuse through the cell walls and out of the same is preferably accomplished by subjecting the ordinary cellular body having spherical-shaped cells and being produced in any of the customary manners to a vacuum. The starting cellular body having the spherical-shaped cells generally has a specific gravity of about 0.05 to 0.15 and the gas in the cells is at a pressure at least equal to atmospheric pressure. Upon being subjected to a vacuum of preferably 60 to 160 mm. Hg for a sufficient length of time, enough gas diffuses through the cell walls into the surrounding evacuated atmosphere to reduce the gas pressure in the cells to below atmospheric pressure. The amount of gas removed will determine the extent to which the cells collapse and the cell walls are wrinkled.

It is preferable during the vacuum treatment to heat the cellular body so as to aid in causing the gas to diffuse out of the same. The temperature to which the cellular body is heated is always at a temperature somewhat below the flowing temperature of the body. The term "flowing temperature" is used to designate that temperature at which the thermoplastic starts to lose its shape, melt somewhat and creep together. Each thermoplastic resin has a different flowing temperature; the temperature at which any particular thermoplastic resin starts to flow can easily be determined by simple pretesting. It is necessary to utilize a temperature in the vacuum treatment which is below the flowing temperature of the thermoplastic resin in order to prevent a permanent deformation of the cellular body. The application of heat promotes the diffusion of the gas out of the cells, thereby facilitating the process and speeding up the same.

The period of treatment generally takes between 4 to 48 hours. The exact time depends, of course, upon the temperature, thickness and type of material, the extent of the vacuum and the type of gas in the cells. Any temperature between 20° C. and the temperature at which the thermoplastic resin starts to flow may be conveniently utilized during the vacuum treatment. For masses either wholly or partly consisting of polyvinylchloride the best working temperature is between 60 to 65° C.

Upon the removal of the cellular body from the vacuum, and cooling in the event that the cellular body has been heated, the body shrinks, the closed cells partially collapse and the cell walls become wrinkled.

The heating of the cellular body for the vacuum treatment can be accomplished by various methods, i. e. by heat convection or heat radiation. When the heating is done in the vacuum itself, it is best accomplished by a high frequency treatment or by infra-red radiation treatment. It is practically impossible to thoroughly heat the cellular body throughout its thickness in the vacuum if the cellular body is very thick. As a practical matter, only thin sheets having a thickness between 20 to 30 mm. can be homogeneously heated in the vacuum vessel. It is always preferable to remove the outer crust from the cellular body before the vacuum treatment in order to facilitate the diffusion-out of the gas from the cells. This is accomplished by shaving-off the crust. It is also desirable, of course, to cut the thermoplastic body into thin sheets.

The gas contained in the cells of the original thermoplastic resin cellular body subjected to the process of the present invention in order to form a cellular body having wrinkled cell walls and improved mechanical properties depends upon the gas originally forced into the cellular body in forming the same. The gas forced into the cellular body originally may either be a slow-diffusing gas, such as nitrogen, or a quick-diffusing gas, such as hydrogen and carbon dioxide; or the gas may be a mixture of a slow-diffusing gas and a quick-diffusing gas. The use of a quick-diffusing gas in the formation of the original cellular body has an advantage due to the ease with which this gas—i. e. hydrogen can diffuse out through the cell walls. The use of such gas can thereby increase the speed of the process.

By the use of a mixture of a slow-diffusing gas, such as nitrogen, and a quick-diffusing gas, such as hydrogen and carbon dioxide, in the forming of the original cellular body the diffusion process can be so controlled that only the quick-diffusing gas diffuses out of the cells while the slow-diffusing gas remains in the same. It is also possible to thereby predetermine the amount of slow-diffusing gas which would remain in the cells.

The method of the invention may be applied to other thermoplastic materials besides polyvinylchloride, such as copolymers of vinylchloride containing a major portion of copolymerized vinylchloride, mixtures of polyvinylchloride with other thermoplastic resins, polyvinyl butyrate, polyvinyl acetate, polyvinyl alcohol, polyvinyl acetals such as polyvinyl formal, polyviny butyral, etc., polyvinylidene chloride, copolymers of vinylidene chloride and vinylchloride, polyvinyl aromatic compounds such as polystyrene, polydichloro-styrene, polyalphamethylstyrene, etc., and acrylic compounds such as polymethylacrylate, polyethylacrylate, polymethylmethacrylate, etc. The thermoplastic resins may be used with or without plasticizers.

The solvents which may be used include acetone, methylethyl ketone, ethylacetate, etc. As illustrative of the plasticizers that may be used are the following: dioctylphthalate, dibutylphthalate, dimethylphthalate, tricresyl phosphate, etc. Any of these plasticizers or mixtures of them may be employed with the process.

The original cellular body may either be formed by forcing gas into the same from without the body, or by the use of a blowing agent.

An excellent blowing agent which may be used in the process is azoisobutyric dinitrile. Other nitrogen-producing blowing agents which may be used are alpha, alpha-azobisiso butyronitrile, diazoaminobenzene, 1,3-bis-(p-xenyl)-triazene, etc. Nitrogen-producing blowing agents are preferred; however, blowing agents which produce other gases such as ammonia or carbon dioxide may be employed. Commonly used blowing agents which produce these gases are sodium bicarbonate and oleic acid, ammonium carbonate, mixtures of ammonium chloride and sodium nitrite etc.

Figure 2:
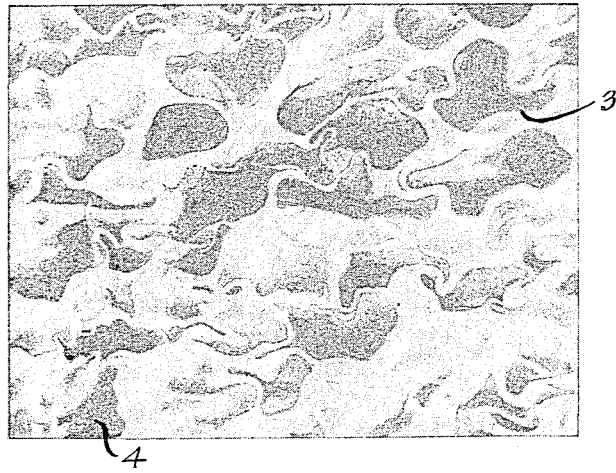

The present invention may be best understood by the following description of the attached drawing, in which:

Fig. 1 is a cross-section of a cellular thermoplastic body having polyhydric cells and being prepared according to known processes; and Fig. 2 is a cross-section of a cellular thermoplastic body prepared according to the present invention and having wrinkled cell walls.

Referring now to the drawings and more particularly to Fig. 1, it is noted that the cell walls 1 are relatively smooth and the cells 2 have a substantially spherical shape. The cellular body of Fig. 1 of which the cross-section is taken is prepared according to the known processes without causing a shrinking of the cells and wrinkling of the cell walls.

Fig. 2, which is a cross-section of a cellular body prepared according to the process of the present invention indicates that the cell walls 3 are no longer smooth and regular and that the cells 4 are irregular and no longer have a substantially spherical shape.

The following examples are given as illustrative of preferred processes of the present invention, the scope of said invention not however being limited thereto:

*Example 1*

A mixture of 64 parts by weight well stabilized polyvinylchloride, 36 parts by weight dioctylphthalate or a similar plasticizer, and 15 parts by weight of ethyl acetate is treated under pressure with a mixture of 90 parts hydrogen and 10 parts nitrogen. About 12 liters of the mixture of the gases is utilized to 1 kg. final product. After heating and cooling the body is expanded in a heating vessel. The resulting cellular body has a specific gravity of about 0.10.

The crust is removed from the cellular body or the cellular body is cut into the needed thicknesses of about 10 to 20 mm. The cellular body is generally cut to a thickness about double the desired thickness of the final cellular body.

The treatment of the thin sheets is accomplished in a vacuum of about 60 mm. Hg at a temperature of about 60 to 65° C. The hydrogen escapes from the sheets in about 6 hours. Upon removal from the vacuum the cells of the cellular body collapse due to the negative pressure (pressure less than atmospheric) in the cells. This results in the cell walls becoming wrinkled. The resulting cellular body has a specific gravity of about 0.5 and a very high resistance to breaking upon bending. The wrinkled cell walls have the ability upon bending of the cellular body to give and stretch somewhat without the material itself being torn.

The cellular body may be used for shoe soles due to its very highly improved mechanical properties and in fact shoe soles made of this cellular body have much better mechanical properties than shoe soles made of ordinary cellular bodies of the same specific gravity and soles of the same thickness made of the same raw material without cells.

*Example 2*

A mixture of 64 parts by weight well stabilized polyvinylchloride and 36 parts by weight dioctylphthalate or a similar high boiling point plasticizer as well as 10 parts by weight azoiso butyric dinitrile is treated in the known manner to form a cellular body.

After expansion in a heating chamber a cellular body is obtained having a specific gravity of about 0.10. The expanded cellular body is free of its outer crust and cut into sheets having a thickness of about 15 mm. each. These sheets are treated in vacuum of about 60 mm. Hg and at a temperature of about 70° C. for about 18 to 36 hours until a sufficient portion of the nitrogen contained in the cells has escaped therefrom. At this point there is no change in the shape of the cells. Upon removal from the vacuum the cell walls become wrinkled and the cells collapse due to the negative pressure in the same. The resulting cellular body has good bendability and it is particularly suitable for the making of soles. The body has a specific gravity of about 0.5.

*Example 3*

A mixture of 60 parts by weight well stabilized polyvinylchloride, 30 parts by weight dioctylphthalate, and 10 parts by weight dibutylphthalate are mixed to form a fine powder. The powder is treated in the usual manner in a mold with an amount of carbon dioxide sufficient so that after expansion the cellular body has a specific gravity of about 0.07. The cellular body is cut into sheets about 15 mm. thick and these sheets are subjected to a vacuum of about 60 mm. Hg at a temperature of 60 to 70° C. for about 6 hours. Upon exposure to the atmosphere the cells collapse, the cell walls become wrinkled and the resulting cellular body has a specific gravity of about 0.65. The resulting cellular body has an improved tensile strength.

Another method of producing cellular bodies having wrinkled cell walls by reducing the pressure in the cells to subatmospheric pressure comprises causing a portion of the gas in the closed cells to be replaced at a raised temperature by a vapor which is liquid at room temperature but is vapor at said raised temperature. Upon cooling, the vapor condenses, thereby reducing the gas pressure in the cells and causing the cells to collapse and the cell walls to become wrinkled. The extent to which the pressure in the cells is lowered upon cooling depends upon the amount of vapor in the cells. The vapor is put in the cells by subjecting the original cellular bodies to an atmosphere at least partially consisting of the vapor so that diffusion causes the vapor in the atmosphere and the gas in the cells to be exchanged until an equilibrium is reached. Water vapor (steam) is highly satisfactory. Other substances which are liquid at room temperature and vaporize at sufficiently low temperatures so as to be suitable are organic solvents such as acetone, methylethylketone, etc.

The gas contained in the original cellular body is not of great importance, though, of course, light, quick-diffusing gases such as hydrogen and carbon dioxide or mixtures thereof facilitate the exchange of the gas in the cells with the vapor in the atmosphere.

The application of this embodiment for the production of cellular bodies having wrinkled cell walls according to the present invention is accomplished by heating the ordinary cellular body having spherical- or polyhedrical-shaped cells in an atmosphere of the vapor at a temperature generally above the temperature at which the resin body starts to soften. For polyvinylchloride masses the softening point of the material is about 70° C. and sheets of this material are heated at a temperature of about 100 to 120° C.

The vapor-containing atmosphere may consist solely of the vapor or may consist of a mixture of the vapor with a gas such as nitrogen. If the vapor is steam the diffusion of the steam into the cells can be accomplished at a temperature of about 120° C. It is unnecessary to utilize a superatmospheric pressure. During the exchange by diffusion of vapor for the gas in the cells, the cells retain their substantially original shape and do not lose this shape until cooling and condensation of the vapor.

The exchange of vapor in the atmosphere with the gas in the cells takes a longer or shorter time depending upon the thickness of the body, the gas contained in the cells, etc. For sheets about 30 mm. thick the exchange by diffusion generally takes about 6 hours.

In the atmosphere of steam or other vapor, the sheet retains its normal appearance and the cells do not shrink or collapse, the cell walls remain even. As the temperature is above the softening point of the resin, the cellular bodies will remain in tension-free condition. The cell contents consists substantially of steam.

By cooling the thus treated cellular bodies, the steam condenses and the pressure in the cells is lowered so rapidly that there is no possibility of diffusion in air from the atmosphere, thereby causing the cellular body to shrink, the specific gravity to increase, the cells to collapse and the cell walls to become wrinkled. The resulting cellular body generally has a specific gravity of about 0.5 to 0.8.

The specific gravity of the thus produced cellular bodies having wrinkled cell walls can be regulated by controlling the amount of vapor in the atmosphere. It is obvious that the less air mixed with the vapor in the cells the greater the specific gravity of the resulting cellular bodies and the more air mixed with the vapor in the cells the lower the specific gravity and the less the cell walls become wrinkled.

The following are given as examples of this embodiment of the present invention, the scope of said invention and of this embodiment not, however, being limited thereto.

*Example 4*

A mixture of 64 parts by weight well stabilized polyvinylchloride, 24 parts by weight dioctylphthalate, and 12 parts by weight dibutylphthalate are mixed with 20 parts methylethylketone to form a loose powder. The powder is treated with hydrogen under pressure and upon release of the pressure and expansion the cellular body thus produced has a specific gravity of about 0.06. The cellular body is cut into sheets about 15 mm. thick and subjected to an atmosphere of superheated steam at a temperature of about 120° C. The steam can be at normal pressure though the pressure may conveniently be raised to ½–1 atmospheres. During this treatment the hydrogen diffuses out of the cells and the steam into the cells. This treatment requires about one-half to three hours for the exchange of the gas and vapor to be substantially complete. Upon cooling the steam condenses resulting in a decrease in volume of the gas and a negative pressure (below atmospheric pressure) being formed in the cells. The cells therefore collapse and the cell walls become wrinkled. The resulting cellular body has a specific gravity of about 0.05 to 0.6 and a high extensibility and resistance to breaking upon bending.

Example 5

A mixture of 64 parts by weight well stabilized polyvinylchloride, 36 parts by weight dioctylphthalate, and 20 parts acetone are mixed to form a loose powder. The powder is treated in the customary manner with hydrogen under pressure and upon expansion a cellular body is formed having a specific gravity of about 0.08.

The cellular body is cut into sheets of about 15 mm. thickness and these sheets are well moistened with acetone. The sheets are then subjected to an atmosphere of nitrogen and acetone vapor for a period of about 1 to 3 hours. The acetone vapor in the cells brought therein by this treatment condenses upon cooling resulting in a reduction of pressure in the cells, thereby causing the cells to collapse and the cell walls to become wrinkled. The specific gravity of the resulting cellular body is about 0.5.

The above example could also be carried out using a mixed polymerisate of 95% vinyl chloride and 5% vinyl acetate, 66 parts of this mixed polymerisate being mixed with 34 parts dioctylphthalate and 20 parts acetone. After expansion the resulting cellular body has a specific gravity of 0.09 and after treatment to cause the cell walls to become wrinkled the resulting cellular body has a specific gravity of about 0.6.

Without further analysis, the foregoing will so fully reveal the gist of the invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to secure by Letters Patent is:

1. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body to partial vacuum at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure so as to cause said closed cells to partially collapse, thereby causing the cell walls to be wrinkled.

2. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body to partial vacuum while heating the same above room temperature but to a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure at a temperature below the temperature at which said thermoplastic resin body starts to flow so as to cause said closed cells to partially collapse, thereby causing the cell walls to be wrinkled.

3. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body to partial vacuum while heating the same at a temperature between 20° C. and a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure so as to cause said closed cells to partially collapse, thereby causing the cell walls to be wrinkled.

4. A process of producing a closed-cell cellular thermoplastic resin article having wrinkled cell walls comprising the steps of forming a gas-expanded cellular thermoplastic resin body having closed gas-permeable cells containing gas at a pressure at least equal to atmospheric pressure; subjecting said cellular thermoplastic resin body to partial vacuum at a pressure of 60 to 160 mm. Hg and at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure so as to cause said closed cells to partially collapse, thereby causing the cells walls to be wrinkled.

5. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; subjecting said cellular thermoplastic resin body to partial vacuum at a pressure of 60 to 160 mm. Hg while heating the same at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure at a temperature below the temperature at which said thermoplastic resin body starts to flow to atmospheric pressure so as to cause said closed cells to partially collapse, thereby causing the cell walls to be wrinkled.

6. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; removing the outer crust of said cellular thermoplastic body; subjecting said cellular thermoplastic resin body having the outer crust thereof removed to a partial vacuum at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure so as to cause said closed cells to partially collapse, thereby causing the cell walls to be wrinkled.

7. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; removing the outer crust of said cellular thermoplastic resin body; subjecting said cellular thermoplastic resin body having the outer crust thereof removed to partial vacuum while heating the same at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed cellular thermoplastic resin body containing gas at below atmospheric pressure to atmospheric pressure at a temperature below the temperature at which said thermoplastic resin body starts to flow so as to cause said closed cells to partially collapse, thereby causing the cell walls to be wrinkled.

8. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; slicing said cellular thermoplastic resin body into thin sheets of the same; subjecting said thin sheets of said cellular thermoplastic resin body to partial vacuum at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed thin sheets of said cellular thermoplastic resin body containing gas at below atmospheric pressure to atmospheric pressure so as to cause said closed cells to partially collapse, thereby causing the cell walls to be wrinkled.

9. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; slicing said cellular thermoplastic resin body into thin sheets of the same having a thickness of 10 to 40 mm.; subjecting said thin sheets of said cellular thermoplastic resin body to partial vacuum at a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed thin sheets of said cellular thermoplastic resin body containing gas at below atmospheric pressure to atmospheric pressure so as to cause said closed cells to partially collapse, thereby causing the cell walls to be wrinkled.

10. A process of producing a closed-cell cellular thermoplastic resin article having wrinkled cell walls, comprising the steps of forming a gas-expanded cellular thermoplastic resin body having closed gas-permeable cells containing gas at a pressure at least equal to atmospheric pressure; slicing said cellular thermoplastic resin body into thin sheets of the same; subjecting said thin sheets of said cellular thermoplastic resin body to partial vacuum while heating the same at a temperature between 20° C. and a temperature below the temperature at which said thermoplastic resin body starts to flow so as to reduce the gas pressure in said closed cells to below atmospheric pressure due to the diffusion of gas through the gas-permeable walls of said closed cells without expansion of said cells; and exposing the thus formed thin sheets of said cellular thermoplastic resin body containing gas at below atmospheric pressure to atmospheric pressure so as to cause said closed cells to partially collapse, thereby causing the cell walls to be wrinkled.

11. As a new article of manufacture closed-cell cellular thermoplastic resin bodies wherein the cell walls of said closed cells are wrinkled.

12. As a new article of manufacture closed-cell cellular thermoplastic resin bodies consisting at least partially of polyvinyl chloride and wherein the cell walls of said closed cells are wrinkled.

References Cited in the file of this patent

UNITED STATES PATENTS

| | | |
|---|---|---|
| 2,420,815 | Cooper et al. | May 20, 1947 |
| 2,525,966 | Smith et al. | Oct. 17, 1950 |
| 2,697,255 | Lindemann | Dec. 21, 1954 |